US009311614B2

(12) United States Patent
Nielsen et al.

(10) Patent No.: US 9,311,614 B2
(45) Date of Patent: *Apr. 12, 2016

(54) METHODS, APPARATUS AND SYSTEMS FOR ONSITE LINKING TO LOCATION-SPECIFIC ELECTRONIC RECORDS OF LOCATE OPERATIONS

(71) Applicant: CertusView Technologies, LLC, Palm Beach Gardens, FL (US)

(72) Inventors: Steven E. Nielsen, North Palm Beach, FL (US); Curtis Chambers, Palm Beach Gardens, FL (US); Jeffrey Farr, Royal Palm Beach, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,353

(22) Filed: Dec. 19, 2014

(65) Prior Publication Data

US 2015/0269500 A1 Sep. 24, 2015

Related U.S. Application Data

(63) Continuation of application No. 13/185,174, filed on Jul. 18, 2011, now Pat. No. 8,918,898.

(60) Provisional application No. 61/369,091, filed on Jul. 30, 2010.

(51) Int. Cl.
*G06F 21/00* (2013.01)
*G06Q 10/06* (2012.01)
(Continued)

(52) U.S. Cl.
CPC ........ *G06Q 10/063* (2013.01); *G06F 17/30241* (2013.01); *G06F 17/30867* (2013.01);
(Continued)

(58) Field of Classification Search
CPC . G06F 21/60; G06F 21/6209; G06F 21/6218; G06F 21/6227
See application file for complete search history.

(56) References Cited

U.S. PATENT DOCUMENTS 3,916,298 A 10/1975 Ulrich
4,600,356 A 7/1986 Bridges
(Continued)

FOREIGN PATENT DOCUMENTS

| AU | 2009213151 | 8/2009 |
| CA | 2631574 | 9/2008 |
| EP | 1726722 | 11/2006 |

OTHER PUBLICATIONS

Responsive Expert Report of Dr. Randel Dymond, P.E. to the Expert Report of Mr. Ivan Zatkovich dated Sep. 30, 2014, filed Nov. 13, 2014; *CertusView Technologies, LLC* v. *S&N Locating Services, LLC et al.*, (Eastern District of Virginia).
(Continued)

*Primary Examiner* — Edward Zee

(57) ABSTRACT

Providing access at a jobsite to an electronic record of a locate operation. Data related to the locate operation is acquired by locate equipment and transmitted to a data repository for storage in the electronic record of the locate operation. A site-specific access mechanism is provided that establishes a link to the electronic record of the locate operation. In one example, the site-specific access mechanism is a physical mechanism, such as a printout of a website address, a barcode, or an RFID tag. In another example the site-specific access mechanism is a virtual mechanism, such as geographic location information provided by a location tracking system (e.g., GPS apparatus) and/or derived from information available to a wireless communications system or WiFi network. In one aspect, the access mechanism may be configured for use at the jobsite only by a person particularly authorized to access the electronic record of the locate operation.

20 Claims, 5 Drawing Sheets

(51) Int. Cl.
*G06F 21/62* (2013.01)
*G06F 21/60* (2013.01)
*G08B 5/22* (2006.01)
*G06Q 10/08* (2012.01)
*G06F 17/30* (2006.01)

(52) U.S. Cl.
CPC ............ *G06F21/60* (2013.01); *G06F 21/6209* (2013.01); *G06F 21/6218* (2013.01); *G06Q 10/0833* (2013.01); *G08B 5/22* (2013.01)

(56) References Cited

U.S. PATENT DOCUMENTS

| | | |
|---|---|---|
| 5,825,660 A | 10/1998 | Cagan et al. |
| 6,345,281 B1 | 2/2002 | Kardos et al. |
| 6,421,725 B1 | 7/2002 | Vermilyea et al. |
| 6,430,562 B1 | 8/2002 | Kardos et al. |
| 6,430,604 B1 | 8/2002 | Ogle |
| 6,470,976 B2 | 10/2002 | Alft |
| 6,532,409 B1 | 3/2003 | Fujishima |
| 6,751,554 B1 | 6/2004 | Asher et al. |
| 6,825,793 B2 | 11/2004 | Taylor, Jr. et al. |
| 6,850,161 B1 * | 2/2005 | Elliott et al. ............... 340/572.1 |
| 6,958,690 B1 | 10/2005 | Asher et al. |
| 6,981,001 B1 | 12/2005 | Reddick et al. |
| 6,999,021 B2 | 2/2006 | Taylor, Jr. |
| 7,113,124 B2 | 9/2006 | Waite |
| 7,117,445 B2 | 10/2006 | Berger |
| 7,136,765 B2 | 11/2006 | Maier et al. |
| 7,281,263 B1 | 10/2007 | LaMastres et al. |
| 7,295,119 B2 | 11/2007 | Rappaport et al. |
| 7,363,345 B2 | 4/2008 | Austin-Lane et al. |
| 7,400,976 B2 | 7/2008 | Young et al. |
| 7,579,960 B2 | 8/2009 | Cheng et al. |
| 7,605,590 B2 | 10/2009 | Mulcahey |
| 7,640,105 B2 | 12/2009 | Nielsen et al. |
| 7,773,095 B1 | 8/2010 | Badrak et al. |
| 7,783,507 B2 | 8/2010 | Schick |
| 8,060,304 B2 | 11/2011 | Nielsen et al. |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,248,056 B1 | 8/2012 | Olsson et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,457,893 B2 | 6/2013 | Nielsen et al. |
| 8,463,487 B2 | 6/2013 | Nielsen et al. |
| 8,467,932 B2 | 6/2013 | Nielsen et al. |
| 8,467,969 B2 | 6/2013 | Nielsen et al. |
| 8,468,206 B2 | 6/2013 | Nielsen et al. |
| 8,473,148 B2 | 6/2013 | Nielsen et al. |
| 8,473,209 B2 | 6/2013 | Nielsen et al. |
| 8,476,906 B2 | 7/2013 | Nielsen et al. |
| 8,478,523 B2 | 7/2013 | Nielsen et al. |
| 8,478,524 B2 | 7/2013 | Nielsen et al. |
| 8,478,525 B2 | 7/2013 | Nielsen et al. |
| 8,478,617 B2 | 7/2013 | Nielsen et al. |
| 8,478,635 B2 | 7/2013 | Nielsen et al. |
| 8,480,332 B2 | 7/2013 | Miller |
| 8,484,300 B2 | 7/2013 | Nielsen et al. |
| 8,510,141 B2 | 8/2013 | Nielsen et al. |
| 8,532,341 B2 | 9/2013 | Nielsen et al. |
| 8,543,651 B2 | 9/2013 | Nielsen et al. |
| 8,543,937 B2 | 9/2013 | Nielsen et al. |
| 8,549,084 B2 | 10/2013 | Nielsen et al. |
| 8,560,164 B2 | 10/2013 | Nielsen et al. |
| 8,566,737 B2 | 10/2013 | Nielsen et al. |
| 8,572,193 B2 | 10/2013 | Nielsen et al. |
| 8,577,707 B2 | 11/2013 | Nielsen et al. |
| 8,583,264 B2 | 11/2013 | Nielsen et al. |
| 8,583,372 B2 | 11/2013 | Nielsen et al. |
| 8,589,201 B2 | 11/2013 | Nielsen et al. |
| 8,589,202 B2 | 11/2013 | Nielsen et al. |
| 8,600,526 B2 | 12/2013 | Nielsen et al. |
| 8,600,848 B2 | 12/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,572 B2 | 12/2013 | Nielsen et al. |
| 8,620,587 B2 | 12/2013 | Nielsen et al. |
| 8,620,616 B2 | 12/2013 | Nielsen et al. |
| 8,620,726 B2 | 12/2013 | Nielsen et al. |
| 8,626,571 B2 | 1/2014 | Nielsen et al. |
| 8,630,463 B2 | 1/2014 | Nielsen et al. |
| 8,644,965 B2 | 2/2014 | Nielsen et al. |
| 8,700,325 B2 | 4/2014 | Nielsen et al. |
| 8,731,830 B2 | 5/2014 | Nielsen et al. |
| 8,805,640 B2 | 8/2014 | Nielsen et al. |
| 8,861,794 B2 | 10/2014 | Nielsen et al. |
| 8,861,795 B2 | 10/2014 | Nielsen et al. |
| 8,917,288 B2 | 12/2014 | Nielsen et al. |
| 8,918,898 B2 | 12/2014 | Nielsen et al. |
| 8,934,678 B2 | 1/2015 | Nielsen et al. |
| 2002/0046259 A1 | 4/2002 | Glorikian |
| 2003/0055666 A1 | 3/2003 | Roddy |
| 2004/0168358 A1 | 9/2004 | Stump |
| 2004/0225444 A1 | 11/2004 | Young et al. |
| 2005/0125389 A1 | 6/2005 | Hazzard et al. |
| 2006/0077095 A1 | 4/2006 | Tucker et al. |
| 2006/0282280 A1 | 12/2006 | Stotz et al. |
| 2007/0010925 A1 | 1/2007 | Yokoyama |
| 2007/0100768 A1 | 5/2007 | Boccon-Gibod et al. |
| 2007/0106784 A1 | 5/2007 | Dickman |
| 2007/0219722 A1 | 9/2007 | Sawyer, Jr. |
| 2008/0021863 A1 | 1/2008 | Evans |
| 2008/0288267 A1 | 11/2008 | Asher |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0210285 A1 | 8/2009 | Nielsen et al. |
| 2009/0210298 A1 | 8/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0088031 A1 | 4/2010 | Nielsen et al. |
| 2010/0088134 A1 | 4/2010 | Nielsen et al. |
| 2010/0088164 A1 | 4/2010 | Nielsen et al. |
| 2010/0090700 A1 | 4/2010 | Nielsen et al. |
| 2010/0109670 A1 | 5/2010 | Arnaud |
| 2010/0188088 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0245086 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0256981 A1 | 10/2010 | Nielsen et al. |
| 2010/0257029 A1 | 10/2010 | Nielsen et al. |

(56) References Cited

U.S. PATENT DOCUMENTS

| | | |
|---|---|---|
| 2010/0257477 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0093306 A1 | 4/2011 | Nielsen et al. |
| 2011/0131081 A1 | 6/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0069178 A1 | 3/2012 | Nielsen et al. |
| 2012/0072035 A1 | 3/2012 | Nielsen et al. |
| 2012/0083968 A1 | 4/2012 | Greiner |
| 2012/0110019 A1 | 5/2012 | Nielsen et al. |
| 2012/0113244 A1 | 5/2012 | Nielsen et al. |
| 2012/0328162 A1 | 12/2012 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |
| 2015/0149242 A1 | 5/2015 | Nielsen et al. |
| 2015/0170089 A1 | 6/2015 | Nielsen et al. |
| 2015/0193717 A1 | 7/2015 | Nielsen et al. |

OTHER PUBLICATIONS

CertusView's Reply in Support of its Motion to Strike and in the Alternative Dismiss S&N's First Amended Answer and Counterclaims (Dkt. No. 253) filed Mar. 2, 2015; *CertusView Technologies, LLC v. S&N Locating Services, LLC et al.*, (Eastern District of Virginia).

CertusView's Request for Leave to File a Sur-Reply in Support of its Opposition to Defendants' Motion for Attorney's Fees filed Mar. 18, 2015; *CertusView Technologies, LLC v. S&N Locating Services, LLC et al.*, (Eastern District of Virginia).

Defendants' Response to CertusView's Motion to Strike and in the Alternative Dismiss S&N's First Amended Answer and Counterclaims (Dkt. No. 253) filed Feb. 23, 2015; *CertusView Technologies, LLC v. S&N Locating Services, LLC et al.*, (Eastern District of Virginia).

Defendant's Response to CertusView's Objections to the Magistrate Judge's Order (Dkt. No. 254) Awarding Sanctions on S&N's Motion to Compel filed Feb. 23, 2015; *CertusView Technologies, LLC v. S&N Locating Services, LLC et al.*, (Eastern District of Virginia).

Defendants' Response to CertusView's Objections to the Magistrate Judge's Order (Dkt. 248) Allowing S&N's Amended Answer and Counterclaims filed Feb. 17, 2015; Case 2:13-cv-00346-MSD-TEM; *CertusView Technologies, LLC v. S&N Locating Services, LLC et al.*, (Eastern District of Virginia).

Opinion and Order to Plaintiff's Rule 72 Objections to the Magistrate Judge's Jan. 16, 2015 Order Granting Defendant's Leave to Amend their Answer and Counterclaims, and on Plaintiff's Motion to Strike and in the Alternative Dismiss S&N's First Amended Answer and Counterclaims, filed May 22, 2015; *CertusView Technologies, LLC v. S&N Locating Services, LLC et al.*, (Eastern District of Virginia).

U.S. Appl. No. 14/612,603, filed Feb. 3, 2015, Nielsen et al.

Office Action dated May 12, 2015 from Canadian Application No. 2,690,239.

"KorTerra C/S Positive Response" (KorTerra, Aug. 28, 2008), archived online: KorTerra-KorTerra Automated Positive Response for One Call Locate Tickets <https://web.archive.org/web/20080828014227/http://www.korterra.com/damage_prevention/KorTerraCS/KorTerra_Positive_Response.htm>, 2 pages.

"TelDig OnceCall" (TelDig Systems, Nov. 10, 2006), archived online: TelDig Systems—Products and Services <https://web.archive.org/web/20061110055008/http://www.teldig.com/en/Text/2003_OneCallWeb.pdf [TelDig One Call], 1 page.

TelDig Systems, Press Releases, "2001-2004 News" (Aug. 2, 2001-Jul. 5, 2004), archived online: TelDig Systems <https://web.archive.org/web/20061110055824/http://teldig.com/en/Text/2001-2004_News.doc> [TelDig Press Releases], 12 pages.

Office Action dated Jan. 12, 2015 from Canadian Application No. 2,690,239.

S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).

Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).

Office Action dated Jun. 18, 2015 from U.S. Appl. No. 12/703,322.

First Action Interview Office Action dated Jun. 12, 2015 from U.S. Appl. No. 14/612,603.

Potts, A., "ArcInfo Version 8: Introducing the Next Generation," ArcUser Magazine (Apr.-Jun. 1999), 4 pages.

"Features and Functions of ArcInfo 8," ESRI. Redlands, California, Sep. 1999, 18 pages.

ESRI Press Release. Redlands, California. Jan. 2000, 3 pages.

Office Action dated Jul. 15, 2015 from U.S. Appl. No. 13/185,194.

S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).

CertusView's Objections to The Magistrate Judge's Order (Dkt. No. 248) Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).

Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).

Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).

Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).

Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).

(56) References Cited

OTHER PUBLICATIONS

Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC v. S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC v. S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC v. S&N Locating Services, LLC et al.*, (Eastern District of Virginia).
Office Action dated Mar. 25, 2015 from U.S. Appl. No. 14/063,417.
US 8,583,461, 4/2010, Nielsen et al. (withdrawn).
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
CGA, Common Ground Alliance, Best Practices, Version 1.0, Apr. 2003, 93 pages.
Examination Report dated Oct. 23, 2013 from Australian Application No. 2010214044.

(56) References Cited

OTHER PUBLICATIONS

Georgia Underground Marking Standards, PSC Rule 515-9-4.14, published online May 2, 2008, http://www.gaupc.com/userfiles/file/Marking_Standards_Presentation_05_02_08.pdf.
Haas, J. et al., "Feed the FLAME—Utility Integrates Field Applications," GeoWorld, Mar. 2007, 5 pages, online: Systems Integration Articles/Enspiria Solutions.
International Search Report and Written Opinion, Application No. PCT/US2011/45203, Dec. 22, 2011.
Notice of Alllowance dated Feb. 28, 2014 from U.S. Appl. No. 12/703,322.
Notice of Allowance dated Feb. 21, 2013 from U.S. Appl. No. 12/824,612.
Notice of Allowance dated May 9, 2013 from U.S. Appl. No. 12/824,635.
Notice of Allowance dated May 22, 2013 from U.S. Appl. No. 12/703,313.
Notice of Allowance dated May 23, 2013 from U.S. Appl. No. 12/824,655.
Notice of Allowance dated Jun. 6, 2013 from U.S. Appl. No. 12/824,635.
Notice of Allowance dated Jun. 20, 2013 from U.S. Appl. No. 12/915,516.
Notice of Allowance dated Jun. 25, 2012 from U.S. Appl. No. 12/824,671.
Notice of Allowance dated Aug. 21, 2014 from U.S. Appl. No. 13/185,174.
Office Action dated Jan. 15, 2014 from U.S. Appl. No. 13/185,174.
Office Action dated Jan. 19, 2012 from U.S. Appl. No. 12/824,671.
Office Action dated Jan. 29, 2013 from U.S. Appl. No. 13/185,174.
Office Action dated Jan. 31, 2012 from U.S. Appl. No. 12/703,322.
Office Action dated Feb. 13, 2014 from Canadian Application No. 2,690,239.
Office Action dated Mar. 14, 2014 from U.S. Appl. No. 14/063,417.
Office Action dated Mar. 26, 2013 from U.S. Appl. No. 12/824,655.
Office Action dated Mar. 27, 2012 from U.S. Appl. No. 12/824,635.
Office Action dated Apr. 3, 2012 from U.S. Appl. No. 12/703,313.
Office Action dated Apr. 8, 2013 from Canadian Application No. 2,690,239.
Office Action dated May 7, 2012 from U.S. Appl. No. 13/193,337.
Office Action dated May 20, 2013 from U.S. Appl. No. 12/915,516.
Office Action dated Jul. 8, 2013 from U.S. Appl. No. 13/185,174.
Office Action dated Jul. 13, 2012 from Canadian Application No. 2,690,239.
Office Action dated Aug. 23, 2012 from U.S. Appl. No. 12/824,635.
Office Action dated Sep. 20, 2013 from Canadian Application No. 2,690,239.
Office Action dated Sep. 25, 2014 from Canadian Application No. 2,690,239.
Office Action dated Oct. 2, 2012 from Australian Patent Application No. 2010214044.
Office Action dated Oct. 11, 2011 from Canadian Application No. 2,690,239.
Office Action dated Oct. 12, 2012 from U.S. Appl. No. 12/824,612.
Office Action dated Oct. 15, 2012 from U.S. Appl. No. 12/703,322.
Office Action dated Oct. 26, 2011 from U.S. Appl. No. 12/703,313.
Office Action dated Nov. 4, 2014 from U.S. Appl. No. 12/703,322.
Office Action dated Nov. 28, 2013 from Canadian Application No. 2,759,932.
Office Action dated Dec. 19, 2012 from U.S. Appl. No. 12/915,516.
Office Action dated Dec. 28, 2012 from U.S. Appl. No. 13/193,337.
Patent Examination Report dated Sep. 5, 2013 from Australian Application No. 2010214044.
Patent Examination Report dated Dec. 16, 2013 from Australian Application No. 2010214044.
Patent Examination Report No. 1 dated Jan. 16, 2014 from Australian Application No. 2011282957.
Patent Examination Report No. 5 dated Apr. 23, 2014 from Australian Application No. 2010214044.
Phase II of the Virginia Pilot Program, Electronic Manifests, VUPS Project Proposal, Jul. 31, 2007, 7 pages.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Supplemental Notice of Allowability dated May 20, 2013 from U.S. Appl. No. 12/824,612.
Supplemental Notice of Allowability dated Aug. 20, 2013 from U.S. Appl. No. 12/703,313.
Supplemental Notice of Allowability dated Sep. 24, 2013 from U.S. Appl. No. 12/915,516.
Supplemental Notice of Allowability from U.S. Appl. No. 12/824,612 dated Apr. 4, 2013.
Virginia Pilot Project Incorporating GPS Technology to Enhance One-Call Damage Prevention, Phase 2: Electronic Manifests, Project Plan (Business Case), Feb. 2009, 22 pages.
Virginia Pilot Project Phase II, Project Team Meeting report, Aug. 31, 2009, 12 pages.
Virginia State Damage Prevention Program Grants Progress Report, Phase 2, Dec. 23, 2008, 7 pages.
VUPS Pilot Program, One-Call Systems International (OCSI) Committee meeting on Nov. 13, 2007—retrieved Dec. 16, 2013 from http://www.commongroundalliance.com/Template.dfm?Section=By_Date&CONTENTID=4528&TEMPLATE=/ContentManagement/ContentDisplay.cfm.
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC v. S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC v. S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC v. S&N Locating Services, LLC et al.*, (Eastern District of Virginia).
Memorandum Order filed Aug. 7, 2015; Case 2:13-cv-00346-MSD-TEM; *CertusView Technologies, LLC v. S&N Locating Services, LLC et al.*, (Eastern District of Virginia).
Examination Report dated Aug. 17, 2015 from Australian Application No. 2014203614.
Newtin Remote Ticket Entry User's Manual, Illinois One-Call System, Jun. 12, 2007, 29 pages.

* cited by examiner

METHODS, APPARATUS AND SYSTEMS FOR ONSITE LINKING TO LOCATION-SPECIFIC ELECTRONIC RECORDS OF LOCATE OPERATIONS

CROSS-REFERENCES TO RELATED APPLICATIONS

The present application claims a priority benefit, under 35 U.S.C. §120, as a continuation (CON) of U.S. nonprovisional application Ser. No. 13/185,174, filed Jul. 18, 2011, entitled "Methods, Apparatus and Systems for Onsite Linking to Location-Specific Electronic Records of Locate Operations."

Ser. No. 13/185,174 in turn claims a priority benefit, under 35 U.S.C. §119(e), to U.S. provisional application Ser. No. 61/369,091, filed Jul. 30, 2010, entitled "Onsite Mechanisms for Linking to Location-Specific Electronic Records of Locate Operations.

Each of the above-identified applications is hereby incorporated by reference in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

A locate operation is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner of an underground facility), and may also include various other information relevant to the proposed excavation or design (e.g., the name of the excavation company, a name of a property owner or party contracting the excavation company to perform the excavation, etc.). The one-call center sends the ticket to one or more underground facility owners and/or one or more locate service providers (who may be acting as contracted agents of the facility owners) so that they can conduct a locate and marking operation to verify a presence or absence of the underground facilities in the dig area. For example, in some instances, a given underground facility owner may operate its own fleet of locate technicians, in which case the one-call center may send the ticket to the underground facility owner. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected, via a connection point, to a target object located in the ground. The transmitter generates the applied signal, which is coupled to the underground facility via the connection point (e.g., to a tracer wire along the facility), resulting in the generation of a magnetic field. The magnetic field in turn is detected by the locate receiver, which itself may include at least one detection antenna. The locate receiver indicates a presence of a facility when it detects electromagnetic fields arising from the applied signal. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

A conventional marking device includes a mechanical actuation system to dispense paint as a marker. Generally speaking, the marking device includes a handle at a proximal end of an elongated shaft and resembles a sort of "walking stick," such that a technician may operate the marking device while standing/walking in an upright or substantially upright position. A marking dispenser holder is coupled to a distal end of the shaft so as to contain and support a marking dispenser, e.g., an aerosol paint can having a spray nozzle. Typically, a marking dispenser in the form of an aerosol paint can is placed into the holder upside down, such that the spray nozzle is proximate to the distal end of the shaft (close to the ground, pavement or other surface on which markers are to be dispensed).

The mechanical actuation system of the marking device includes an actuator or mechanical trigger proximate to the handle that is actuated/triggered by the technician (e.g., via pulling, depressing or squeezing with fingers/hand). The actuator is connected to a mechanical coupler (e.g., a rod) disposed inside and along a length of the elongated shaft. The coupler is in turn connected to an actuation mechanism, at the distal end of the shaft, which mechanism extends outward from the shaft in the direction of the spray nozzle. Thus, the actuator, the mechanical coupler, and the actuation mechanism 58 constitute the mechanical actuation system of the marking device.

In the non-actuated state of the conventional marking device, the actuator is "at rest" (not being pulled) and, as a result, the actuation mechanism is not in contact with the spray nozzle. In the actuated state, the actuator is being actuated (pulled, depressed, squeezed) by the technician. When actuated, the actuator displaces the mechanical coupler and the actuation mechanism such that the actuation mechanism contacts and applies pressure to the spray nozzle, thus causing the spray nozzle to deflect slightly and dispense paint. The mechanical actuation system is spring-loaded so that it automatically returns to the non-actuated state when the actuator is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

Applicants have recognized and appreciated that uncertainties which may be attendant to locate and marking operations may be significantly reduced by collecting various information particularly relating to the marking operation, and in some cases both the marking operation and the corresponding locate operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collection. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter's applied signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Yet, Applicants have recognized and appreciated that collecting location data, such as GPS data, in connection with use of a locate device may be valuable for reasons other than marking a location of an underground facility. For example, the data may be valuable in monitoring the performance of a technician (e.g., by comparing performance to a known "signature" of a technician's historical performance), mapping areas of poor signal strength, or for other reasons. The data may be processed in various manners of use to various parties, depending on their particular interest in a locate operation. In addition, as described further below, the collection of GPS data with respect to both locate and marking operations, as opposed to locate operations alone, may also provide valuable insight and analysis potential with respect to various aspects (e.g., technician performance, comparison to historical data, etc.) of a locate operation.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate devices, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam).

In view of the foregoing, embodiments of the invention relate to methods, apparatus and systems for onsite linking to location-specific electronic records of locate operations. For example, a locate operations system of the present invention may include a data generating system, a central data repository, and a data retrieval system. The data generating system may be used for collecting and/or generating electronic data relating to locate operations. At the completion of a locate operation, the electronic data relating to the locate operation is uploaded from the data generating system to the central data repository and stored in an electronic record of the locate operation.

In one embodiment, the data generating system may be used to create a physical mechanism, such as, but not limited to, a printed web page address and/or a barcode tag and/or a radio-frequency identification (RFID) tag that is encoded with the network link or path to the central data repository by which the electronic record may be accessed and/or retrieved. The physical mechanism for linking to the electronic record of the locate operation (hereafter referred to as a site-specific "hard link") is then left at the jobsite. At a later time, an interested party may arrive at the jobsite and use the data retrieval system to interrogate the information encoded into the site-specific hard link, which was left at the jobsite. For example, the data retrieval system may include a mechanism, such as a barcode reader and/or an RFID reader, for extracting the link information encoded in the site-specific hard link. The printed web page address may be manually entered by the user into an onsite computer or may be read, for example, by an optical character reader. Once the information is extracted, the link may be used to access and/or retrieve the corresponding electronic record of the locate operation.

In another embodiment, a virtual mechanism (hereafter referred to as a site-specific "virtual link") may be used to provide the network link or path to the central data repository by which the electronic record may be accessed and/or retrieved. One example of a site-specific virtual link is the latitude and longitude coordinates of the jobsite as provided by a location tracking system, such as a Global Positioning System (GPS) device, at the jobsite. In this example, the electronic records of locate operations are encoded with geo-location data. The data retrieval system acquires the current geo-location of the jobsite and then queries the central data repository for one or more electronic records of locate operations that substantially match the current geo-location. In this way, the geo-location information acquired at the jobsite is used as the site-specific virtual link to the corresponding electronic records.

The hard link and the virtual link serve as site-specific access mechanisms to enable access to the electronic record of the locate operation. The access to the electronic record may include read-only access to the electronic record and, under appropriate circumstances, downloading all or part of the electronic record and/or modifying the electronic record. In order to make use of the site-specific hard link and/or the site-specific virtual link, it is a requirement that the interested party be present at the jobsite to retrieve electronic records of locate operations that correspond to the jobsite location.

According to a first aspect of the invention, a method is provided for accessing an electronic record of a locate operation to locate the presence or absence of underground facilities at a jobsite. The method comprises acquiring, by locate equipment, data related to the locate operation; transmitting, by the locate equipment, the acquired data to a data repository for storage in an electronic record of the locate operation; and providing a site-specific access mechanism containing a link to the electronic record of the locate operation, the access mechanism configured for use at the jobsite by an authorized person to access the electronic record of the locate operation.

According to a second aspect of the invention, a method is provided for accessing an electronic record of a locate operation to locate the presence or absence of underground facilities at a jobsite. The method comprises obtaining a site-specific access mechanism that contains a link to an electronic record of the locate operation; and using the access mechanism at the jobsite to access the electronic record of the locate operation.

According to a third aspect of the invention, a locate operations system is provided to locate and record the presence or absence of underground facilities at a jobsite. The locate operations system comprises a data generating component configured to acquire data related to a locate operation, to transmit the acquired data to a data repository for storage in an electronic record of the locate operation and to provide a site-specific access mechanism containing a link to the electronic record of the locate operation; a data repository component configured to store the electronic record of the locate operation; and a data retrieval component configured to obtain the access mechanism and to use the access mechanism at the jobsite to access the electronic record of the locate operation.

According to a fourth aspect of the invention, a data generating system is provided for use in a locate operation to locate the presence or absence of underground facilities at a jobsite. The data generating system comprises a data acquisition module configured to acquire data related to the locate operation; a communications module configured to transmit the acquired data to a data repository for storage in an electronic record of the locate operation; and an access control module configured to generate a site-specific access mechanism containing a link to the electronic record of the locate operation.

According to a fifth aspect of the invention, a data retrieval system is provided for use in a locate operation to locate the presence or absence of underground facilities at a jobsite. The data retrieval system comprises an access mechanism reader configured to read a site-specific access mechanism that contains a link to an electronic record of the locate operation; and an access module configured to use the link to access the electronic record of the locate operation.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "locate equipment" refers to any device or apparatus used by a technician in connection with performance of a locate and/or marking operation (e.g., a locate device such as a transmitter and/or receiver, a marking device, a combined locate and marking device, etc.).

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2011-0135163-A1, published Jun. 9, 2011, filed Feb. 16, 2011, and entitled "Methods and Apparatus for Providing Unbuffered Dig Area Indicators on Aerial Images to Delimit Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0256825-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0255182-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0245086-A1, published Sep. 30, 2010, filed Jun. 9, 2010, and entitled "Marking Apparatus Configured To Detect Out-Of-Tolerance Conditions In Connection With Underground Facility Marking Operations, And Associated Methods And Systems;"

U.S. publication no. 2010-0247754-A1, published Sep. 30, 2010, filed Jun. 9, 2010, and entitled "Methods and Apparatus For Dispensing Marking Material In Connection With Underground Facility Marking Operations Based on Environmental Information and/or Operational Information;"

U.S. publication no. 2010-0262470-A1, published Oct. 14, 2010, filed Jun. 9, 2010, and entitled "Methods, Apparatus, and Systems For Analyzing Use of a Marking Device By a Technician To Perform An Underground Facility Marking Operation;"

U.S. publication no. 2010-0263591-A1, published Oct. 21, 2010, filed Jun. 9, 2010, and entitled "Marking Apparatus Having Environmental Sensors and Operations Sensors for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2010-0253511-A1, published Oct. 7, 2010, filed Jun. 18, 2010, and entitled "Locate Apparatus Configured to Detect Out-of-Tolerance Conditions in Connection with Underground Facility Locate Operations, and Associated Methods and Systems;"

U.S. publication no. 2010-0257029-A1, published Oct. 7, 2010, filed Jun. 18, 2010, and entitled "Methods, Apparatus, and Systems For Analyzing Use of a Locate Device By a Technician to Perform an Underground Facility Locate Operation;"

U.S. publication no. 2010-0253513-A1, published Oct. 7, 2010, filed Jun. 18, 2010, and entitled "Locate Transmitter Having Enhanced Features For Underground Facility Locate Operations, and Associated Methods and Systems;"

U.S. publication no. 2010-0253514-A1, published Oct. 7, 2010, filed Jun. 18, 2010, and entitled "Locate Transmitter Configured to Detect Out-of-Tolerance Conditions In Connection With Underground Facility Locate Operations, and Associated Methods and Systems;"

U.S. publication no. 2010-0256912-A1, published Oct. 7, 2010, filed Jun. 18, 2010, and entitled "Locate Apparatus for Receiving Environmental Information Regarding Underground Facility Marking Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0259381-A1, published Oct. 14, 2010, filed Jun. 28, 2010, and entitled "Methods, Apparatus and Systems for Notifying Excavators and Other Entities of the Status of in-Progress Underground Facility Locate and Marking Operations;"

U.S. publication no. 2010-0262670-A1, published Oct. 14, 2010, filed Jun. 28, 2010, and entitled "Methods, Apparatus and Systems for Communicating Information Relating to the Performance of Underground Facility Locate and Marking Operations to Excavators and Other Entities;"

U.S. publication no. 2010-0259414-A1, published Oct. 14, 2010, filed Jun. 28, 2010, and entitled "Methods, Apparatus And Systems For Submitting Virtual White Line Drawings And Managing Notifications In Connection With Underground Facility Locate And Marking Operations;"

U.S. publication no. 2010-0268786-A1, published Oct. 21, 2010, filed Jun. 28, 2010, and entitled "Methods, Apparatus and Systems for Requesting Underground Facility Locate and Marking Operations and Managing Associated Notifications;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0324967-A1, published Dec. 23, 2010, filed Jul. 9, 2010, and entitled "Management System, and Associated Methods and Apparatus, for Dispatching Tickets, Receiving Field Information, and Performing A Quality Assessment for Underground Facility Locate and/or Marking Operations;"

U.S. publication no. 2010-0318401-A1, published Dec. 16, 2010, filed Jul. 9, 2010, and entitled "Methods and Apparatus for Performing Locate and/or Marking Operations with Improved Visibility, Quality Control and Audit Capability;"

U.S. publication no. 2010-0318402-A1, published Dec. 16, 2010, filed Jul. 9, 2010, and entitled "Methods and Apparatus for Managing Locate and/or Marking Operations;"

U.S. publication no. 2010-0318465-A1, published Dec. 16, 2010, filed Jul. 9, 2010, and entitled "Systems and Methods for Managing Access to Information Relating to Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2011-0060496-A1, published Mar. 10, 2011, filed Aug. 10, 2010, and entitled "Systems and Methods for Complex Event Processing of Vehicle Information and Image Information Relating to a Vehicle.;"

U.S. publication no. 2011-0093162-A1, published Apr. 21, 2011, filed Dec. 28, 2010, and entitled "Systems And Methods For Complex Event Processing Of Vehicle-Related Information;"

U.S. publication no. 2011-0093306-A1, published Apr. 21, 2011, filed Dec. 28, 2010, and entitled "Fleet Management Systems And Methods For Complex Event Processing Of Vehicle-Related Information Via Local And Remote Complex Event Processing Engines;"

U.S. publication no. 2011-0093304-A1, published Apr. 21, 2011, filed Dec. 29, 2010, and entitled "Systems And Methods For Complex Event Processing Based On A Hierarchical Arrangement Of Complex Event Processing Engines;"

U.S. publication no. 2010-0257477-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0256981-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2011-0035251-A1, published Feb. 10, 2011, filed Jul. 15, 2010, and entitled "Methods, Apparatus, and Systems for Facilitating and/or Verifying Locate and/or Marking Operations;"

U.S. publication no. 2011-0035328-A1, published Feb. 10, 2011, filed Jul. 15, 2010, and entitled "Methods, Apparatus, and Systems for Generating Technician Checklists for Locate and/or Marking Operations;"

U.S. publication no. 2011-0035252-A1, published Feb. 10, 2011, filed Jul. 15, 2010, and entitled "Methods, Apparatus, and Systems for Processing Technician Checklists for Locate and/or Marking Operations;"

U.S. publication no. 2011-0035324-A1, published Feb. 10, 2011, filed Jul. 15, 2010, and entitled "Methods, Apparatus, and Systems for Generating Technician Workflows for Locate and/or Marking Operations;"

U.S. publication no. 2011-0035245-A1, published Feb. 10, 2011, filed Jul. 15, 2010, and entitled "Methods, Apparatus, and Systems for Processing Technician Workflows for Locate and/or Marking Operations;"

U.S. publication no. 2011-0035260-A1, published Feb. 10, 2011, filed Jul. 15, 2010, and entitled "Methods, Apparatus, and Systems for Quality Assessment of Locate and/or Marking Operations Based on Process Guides;"

U.S. publication no. 2010-0256863-A1, published Oct. 7, 2010, filed Apr. 2, 2010, and entitled "Methods, Apparatus, and Systems for Acquiring and Analyzing Vehicle Data and Generating an Electronic Representation of Vehicle Operations;"

U.S. publication no. 2011-0022433-A1, published Jan. 27, 2011, filed Jun. 24, 2010, and entitled "Methods and Apparatus for Assessing Locate Request Tickets;"

U.S. publication no. 2011-0040589-A1, published Feb. 17, 2011, filed Jul. 21, 2010, and entitled "Methods and Apparatus for Assessing Complexity of Locate Request Tickets;"

U.S. publication no. 2011-0046993-A1, published Feb. 24, 2011, filed Jul. 21, 2010, and entitled "Methods and Apparatus for Assessing Risks Associated with Locate Request Tickets;"

U.S. publication no. 2011-0046994-A1, published Feb. 17, 2011, filed Jul. 21, 2010, and entitled "Methods and Apparatus for Multi-Stage Assessment of Locate Request Tickets;"

U.S. publication no. 2011-0040590-A1, published Feb. 17, 2011, filed Jul. 21, 2010, and entitled "Methods and Apparatus for Improving a Ticket Assessment System;"

U.S. publication no. 2011-0020776-A1, published Jan. 27, 2011, filed Jun. 25, 2010, and entitled "Locating Equipment for and Methods of Simulating Locate Operations for Training and/or Skills Evaluation;"

U.S. publication no. 2010-0285211-A1, published Nov. 11, 2010, filed Apr. 21, 2010, and entitled "Method Of Using Coded Marking Patterns In Underground Facilities Locate Operations;"

U.S. publication no. 2011-0137769-A1, published Jun. 9, 2011, filed Nov. 5, 2010, and entitled "Method Of Using Coded Marking Patterns In Underground Facilities Locate Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2011-0007076-A1, published Jan. 13, 2011, filed Jul. 7, 2010, and entitled, "Methods, Apparatus and Systems for Generating Searchable Electronic Records of Underground Facility Locate and/or Marking Operations;"

U.S. publication no. 2011-0131081-A1, published Jun. 2, 2011, filed Oct. 29, 2010, and entitled "Methods, Apparatus, and Systems for Providing an Enhanced Positive Response in Underground Facility Locate and Marking Operations;"

U.S. publication no. 2011-0060549-A1, published Mar. 10, 2011, filed Aug. 13, 2010, and entitled, "Methods and Apparatus for Assessing Marking Operations Based on Acceleration Information;"

U.S. publication no. 2011-0117272-A1, published May 19, 2011, filed Aug. 19, 2010, and entitled, "Marking Device with Transmitter for Triangulating Location During Locate Operations;"

U.S. publication no. 2011-0045175-A1, published Feb. 24, 2011, filed May 25, 2010, and entitled, "Methods and Marking Devices with Mechanisms for Indicating and/or Detecting Marking Material Color;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2011-0095885 A9 (Corrected Publication), published Apr. 28, 2011, and entitled, "Methods And Apparatus For Generating Electronic Records Of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;"

U.S. publication no. 2010-0085054 A1, published Apr. 8, 2010, filed Sep. 30, 2009, and entitled, "Systems and Methods for Generating Electronic Records of Locate And Marking Operations;" and U.S. publication no. 2011-0046999-A1, published Feb. 24, 2011, filed Aug. 4, 2010, and entitled, "Methods and Apparatus for Analyzing Locate and Marking Operations by Comparing Locate Information and Marking Information."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The present invention, both as to its organization and manner of operation, together with further objectives and advantages, may be best understood by reference to the following description, taken in connection with the accompanying drawings as set forth below.

DETAILED DESCRIPTION

Figure 1:
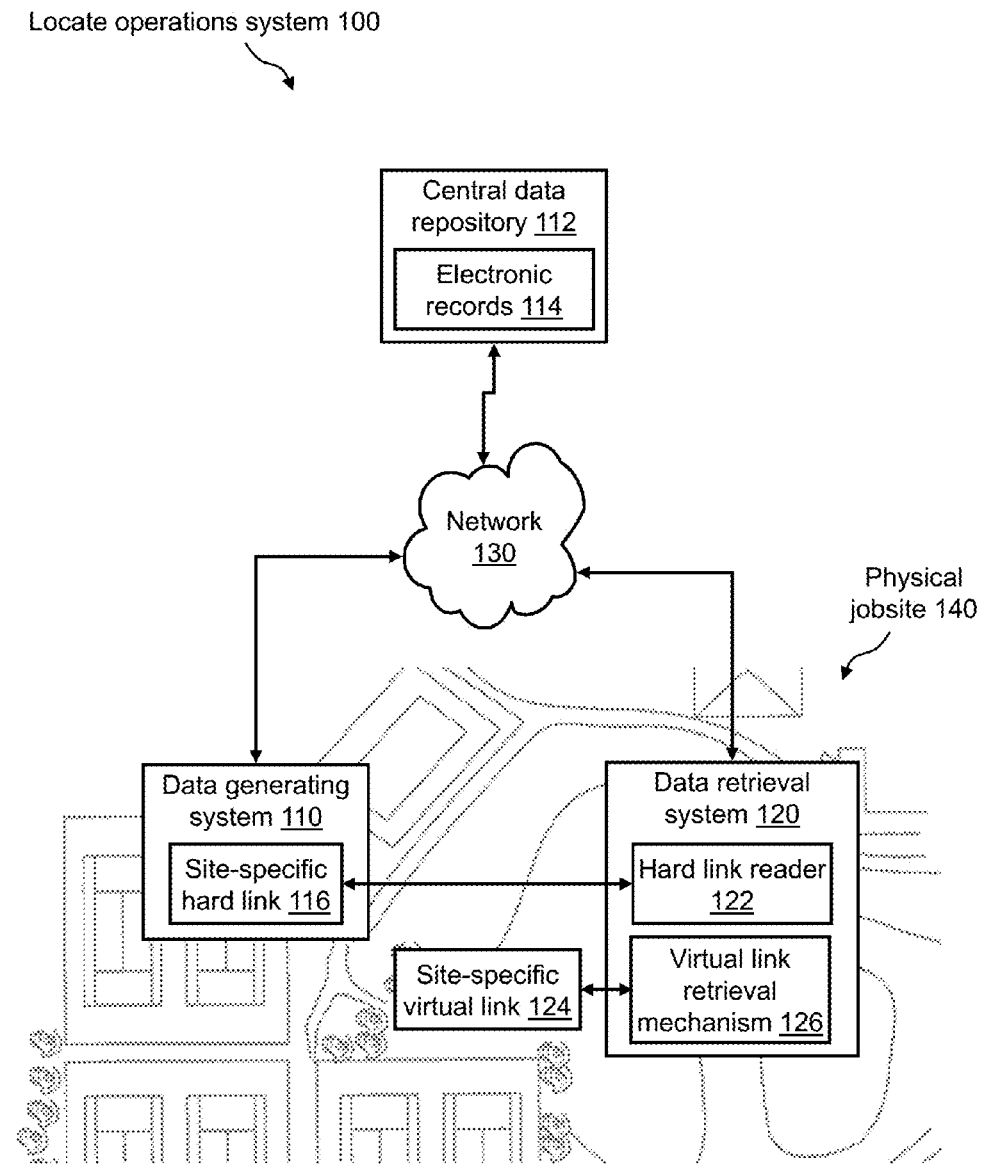
FIG. 1 is a functional block diagram of an example of a locate operations system for providing onsite mechanisms for linking to location-specific electronic records of locate operations, according to embodiments of the invention.

Various embodiments of the present invention relate generally to methods, apparatus and systems for onsite linking to location-specific electronic records of locate operations. For example, a locate operations system according to the present invention may include a data generating system, a central data repository, and a data retrieval system. The data generating system may be used for collecting and/or generating electronic data relating to locate operations. At the completion of a locate operation, the electronic data relating to the locate operation is uploaded from the data generating system to the central data repository and stored in an electronic record of the locate operation.

In one embodiment, the data generating system may be used to create a physical mechanism, such as, but not limited to, a printed web page address and/or a barcode tag and/or a radio-frequency identification (RFID) tag that is encoded with the network link or path to the central data repository by which the electronic record may be accessed and/or retrieved. The physical mechanism for linking to the electronic record of the locate operation (hereafter referred to as a site-specific hard link) is then left at the jobsite. At a later time, an interested party may arrive at the jobsite and use the data retrieval system to interrogate the information encoded into the site-specific hard link, which was left at the jobsite. For example, the data retrieval system may include a mechanism, such as a barcode reader and/or an RFID reader, for extracting the link information encoded in the site-specific hard link. The printed web page address may be manually entered by the user into an onsite computer or may be read, for example, by an optical character reader. Once the information is extracted, the link may be used to access and/or retrieve the corresponding electronic record of the locate operation.

In another embodiment, a virtual mechanism (hereafter referred to as site-specific virtual link) may be used to provide the network link or path to the central data repository by which the electronic record may be accessed and/or retrieved. One example of a site-specific virtual link is the latitude and longitude coordinates of the jobsite as provided by a location tracking system, such as a Global Positioning System (GPS) device, at the jobsite. In this example, the electronic records of locate operations are encoded with geo-location data. The data retrieval system acquires the current geo-location of the jobsite and then queries the central data repository for one or more electronic records of locate operations that substantially match the current geo-location. In this way, the geo-location information acquired at the jobsite is used as the site-specific virtual link to the corresponding electronic records.

The hard link and the virtual link serve as site-specific access mechanisms to enable access to the electronic record of the locate operation. The access to the electronic record may include read-only access to the electronic record and, under appropriate circumstances, downloading all or part of the electronic record and/or modifying the electronic record. In order to make use of the site-specific hard link and/or the site-specific virtual link, it is a requirement that the interested party be present at the jobsite in order to retrieve electronic records of locate operations that correspond to the jobsite location.

FIG. 1 is a functional block diagram of an example of a locate operations system 100 for providing onsite mechanisms for linking to location-specific electronic records of locate operations. Locate operations system 100 may include, for example, a data generating system 110. Data generating system 110 may be used for collecting and/or generating electronic data relating to locate operations. For example, data generating system 110 may be used for collecting and/or generating electronic data by use of locating equipment used during locate operations. Examples of locating equipment may include, but are not limited to, marking devices, locate receiver devices, locate transmitter devices, and any combinations thereof. Details of an example of data generating system 110 that includes locating equipment are described with reference to FIG. 2.

At the completion of a locate operation, the electronic data (not shown) about the locate operation is uploaded via a network 130 from data generating system 110 to, for example, a central data repository 112 of locate operations system 100 and stored in electronic records 114, which are electronic records of locate operations. Network 130 may be, for example, a local area network (LAN) and/or a wide area network (WAN). Electronic records 114 may include any information related to or representative of locate operations. Electronic records 114 may include a complete record of a locate operation or an incomplete record in which some information elements are not present in the electronic record. Also, electronic records 114 may include records of one or more locate operations at a jobsite. Details of an example of central data repository 112 and the contents of electronic records 114 are described with reference to FIG. 3.

In one embodiment, data generating system 110 may be used to create a site-specific hard link 116 for the current locate operation. For example, site-specific hard link 116 may be any physical mechanism encoded with the network link or path to central data repository 112 by which the electronic record 114 of the current locate operation may be accessed and/or retrieved. The site-specific hard link 116 for linking to the electronic record 114 of the locate operation is then left at the jobsite. Details of examples of site-specific hard links 116 are described with reference to FIG. 2.

Referring again to FIG. 1, data generating system 110 is shown at a physical jobsite 140, which represents the physical jobsite (e.g., physical address) of the current locate operation for which the site-specific hard link 116 is being created. In the example of locate operations system 100, the information encoded into site-specific hard link 116 is specifically associated with physical jobsite 140. Site-specific hard link 116 is left at physical jobsite 140 for use by interested parties at any time after the completion of the locate operations (i.e., after the creation of site-specific hard link 116). More specifically, at a later time, an interested party may arrive at the jobsite and use a data retrieval system 120 to interrogate the information encoded into the site-specific hard link 116, which was left at the jobsite. For example, data retrieval system 120 may include a hard link reader 122, which may be any mechanisms for extracting the link information encoded in site-specific hard link 116. Once the information is extracted using hard link reader 122, the link may be used to access and/or retrieve the corresponding electronic record 114 of the locate operation.

In another embodiment, a virtual mechanism, such as a site-specific virtual link 124, may be used to provide the network link or path to central data repository 112 by which electronic record 114 may be accessed and/or retrieved. In order to retrieve the information of site-specific virtual link 124, data generating system 110 may include a virtual link retrieval mechanism 126. In one example, site-specific virtual link 124 may be latitude and longitude coordinates of the jobsite (e.g., physical jobsite 140). In this example, virtual link retrieval mechanism 126 is a location tracking system, such as a GPS device, at the jobsite. Further to this example, electronic record 114 is encoded with GPS coordinates. Referring again to FIG. 1, data retrieval system 120 uses virtual link retrieval mechanism 126 to acquire the site-specific virtual link 124, which is the GPS coordinates of physical jobsite 140.

Data retrieval system 120 then queries central data repository 112 for electronic records 114 that substantially match (e.g., within a specified range of geographic coordinates) the GPS coordinates of physical jobsite 140. The acquired GPS coordinates may be used as a reference location to access one or more electronic records 114 in central data repository 112. The central data repository 112 may return, for example, a list of one or more electronic records with GPS coordinates closest to the reference location or a list of one or more electronic records with GPS coordinates within a specified range (e.g., one quarter mile) of the reference location. The requestor may then select an electronic record from the list of electronic records. Authentication of the requestor may be performed before the list of electronic records is returned, upon selection of an electronic record from the list of electronic records, or both. Site-specific virtual link 124 is virtual because it provides link information without using a physical device left at the jobsite. However, like site-specific hard link 116, site-specific virtual link 124 may be queried only by being physically present at the jobsite. Like site-specific hard link 116, site-specific virtual link 124 is used to link to the corresponding electronic records 114.

In order to make use of site-specific hard link 116 and/or site-specific virtual link 124, it is required that the interested party be present at the jobsite (e.g., physical jobsite 140) in order to retrieve electronic records 114 of locate operations that correspond to that jobsite location. Details of an example of data retrieval system 120 are described with reference to FIG. 4.

Additionally, central data repository 112 may be programmed to allow different levels of access to electronic records 114 that are stored thereon. For example, once the link is accessed, an authentication and authorization process may be initiated for allowing a level of access. That is, the access to the record may be different depending on the level of authorization. For example, an excavator may be authorized to access only a limited portion of the electronic record 114. An inspector and/or regulator may be authorized to access a yet greater portion of the electronic record 114. The facility owner may be authorized to access the entirety of the electronic record 114. In one example, this functionality may be implemented as a viewer that differentiates the amount of information that is displayed based on the level of authorization of the user. Further, central data repository 112 may be programmed to keep a log of the activity with respect to accessing electronic records 114 using site-specific hard links 116 and/or site-specific virtual links 124.

Additionally, central data repository 112 may be programmed such that site-specific hard links 116 and/or site-specific virtual links 124 have expiration dates. In one example, the expiration date may correlate to the expiration date of the originating locate operation work order, which may be based on certain regulations and/or guidelines with respect to locate operations. Once the link has expired, access to the corresponding electronic records 114 is blocked. A "Link Has Expired" message may be presented to the user upon attempting to access an expired link.

Figure 2:
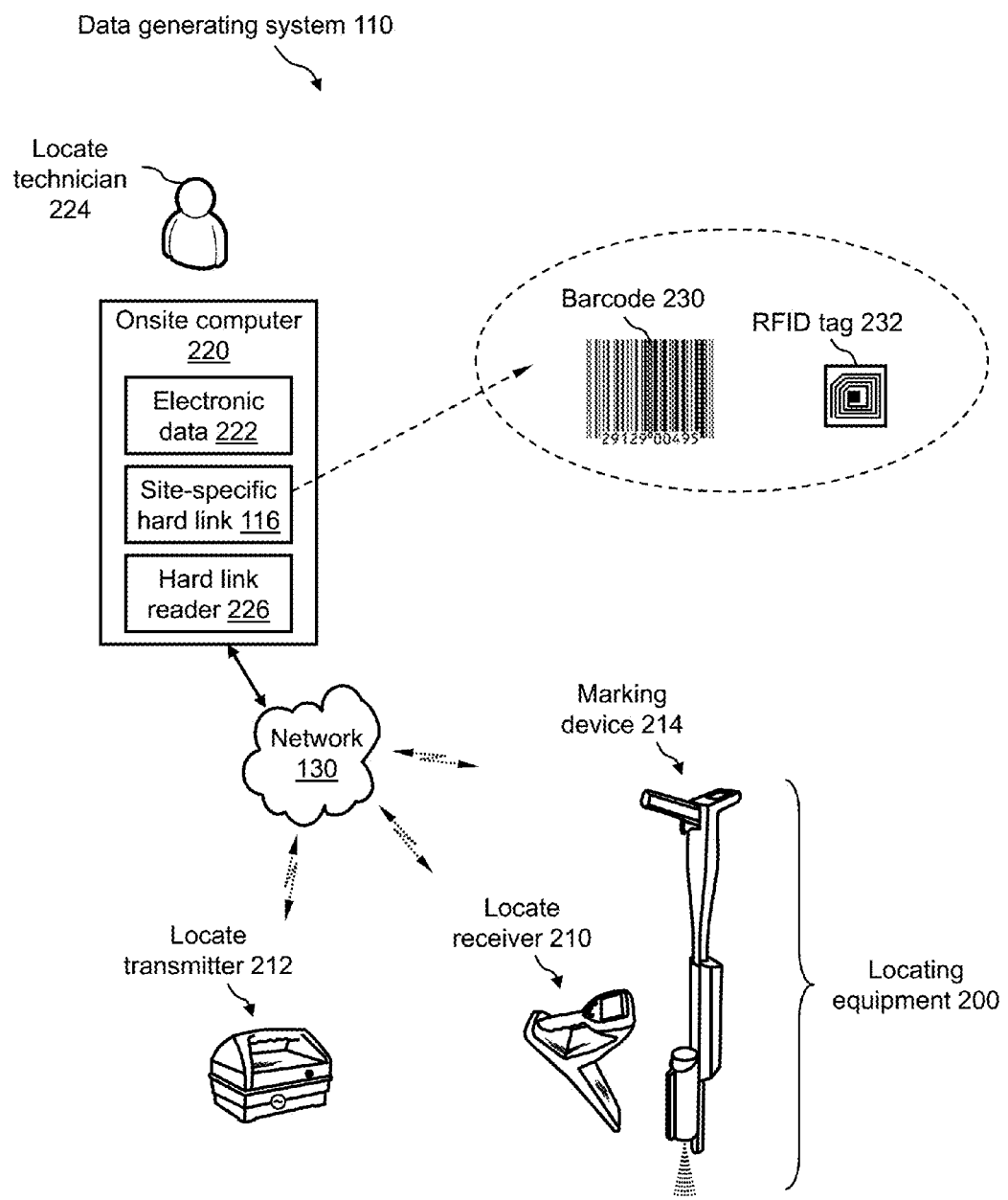
FIG. 2 is a functional block diagram of an example of a data generating system of the locate operations system of FIG. 1, according to embodiments of the invention.

FIG. 2 is a functional block diagram of an example of data generating system 110 of locate operations system 100 of FIG. 1. In one example, data generating system 110 may include locating equipment 200, which is used by locate technicians to perform locate operations. Locating equipment 200 may include, for example, one or more of a locate receiver 210, a locate transmitter 212, a marking device 214, and any combinations thereof. A locate receiver, such as locate receiver 210, is an instrument for detecting facilities that are concealed in some manner, such as cables and pipes that are located underground. The locate receiver detects electromagnetic fields that are emitted from a facility, such as the underground facility that is the target of the locate operation. A signal, or lack thereof, detected by locate receiver 210 indicates the presence or absence of the underground facility. The source of the detection signal injected along the underground facility may be a locate transmitter, such as locate transmitter 212, that is electrically coupled to the underground facility. Once the presence or absence of the underground facility is detected, a marking device, such as marking device 214, is used to dispense a marking material on, for example, the surface of the ground at the location of the underground facility in order to indicate its presence or absence.

Locate receiver 210 may be any locate receiver that is capable of generating and/or collecting electronic information relating to locate operations. In one example, locate receiver 210 may be a geo-enabled electronic locate receiver device, such as the geo-enabled electronic locate receiver device described in U.S. Patent Publication No. 2010/0088032, entitled "Methods, Apparatus, and Systems for Generating Electronic Records of Locate and Marking Operations, and Combined Locate and Marking Apparatus for Same", which is incorporated herein by reference in its entirety.

Locate transmitter 212 may be any standard locate transmitter and/or a locate transmitter capable of generating and/or collecting electronic information about locate operations.

Marking device 214 may be any marking device capable of generating and/or collecting electronic information about marking operations. In one example, marking device 214 may be a geo-enabled electronic marking device, such as the geo-enabled electronic marking device described in the above-mentioned U.S. Patent Publication No. 2010/0088032.

Locate receiver 210, locate transmitter 212, and marking device 214 may include a wired and/or wireless communication interface (not shown) for exchanging information with any entity connected to network 130. For example, locate receiver 210, locate transmitter 212, and/or marking device 214 may exchange information with an onsite computer 220 of data generating system 110.

Onsite computer 220 may be any computing device that is used by locate personnel in the field, such as a locate technician 224. For example, onsite computer 220 may be an onboard computer associated with a vehicle, a portable computer, a personal computer, a laptop computer, a tablet device, a personal digital assistant (PDA), a cellular radiotelephone, a mobile computing device, a touch-screen device, a touchpad device, or generally any device including, or connected to, a processor and a user interface.

Onsite computer 220 may be used by locate technician 224 for collecting and processing electronic information received from locate receiver 210, locate transmitter 212, and/or marking device 214. For example, the electronic information from locate receiver 210, locate transmitter 212, and/or marking device 214 may be stored in electronic data 222 at onsite computer 220. A component of electronic data 222 may be locating data from locate receiver 210 and/or locate transmitter 212. Another component of electronic data 222 may be marking data from marking device 214. At the completion of a locate operation, electronic data 222 may be uploaded from onsite computer 220 to central data repository 112 (FIG. 1) via network 130 and stored in electronic records 114 at central data repository 112. A component of the electronic data 222 may be locating data from locate receiver 210 and/or locate transmitter 212. Another component of electronic data 222 may be marking data from marking device 214.

Further, onsite computer 220 may include mechanisms (not shown) for creating and/or otherwise processing site-specific hard links 116. Site-specific hard links 116 may be any physical mechanisms that are capable of holding unique information, such as a unique identification number, associated with a network link or path. In one example, site-specific hard link 116 is a printed web page address, which may be accessed via onsite computer 220. In another example, site-specific hard link 116 is a printed barcode, such as a barcode 230 shown in FIG. 2. As is well-known, a barcode is an optical machine-readable representation of data. In some examples, barcodes represent data by varying the widths and spacing of parallel lines, and such examples often are referred to as linear or one-dimensional (1D) barcodes. Other examples of barcodes may include geometric patterns in two-dimensions (e.g., rectangles, dots, hexagons, symbols, etc.) to form two-dimensional (2D) barcodes. A specific example of a 2D barcode is given by a "quick response" code (QR code), which typically includes black modules arranged in a square pattern on a white background.

Onsite computer 220 may also include a corresponding hard link reader 226, which, in this example, is any conventional barcode scanner device connected to onsite computer 220 and/or any well-known barcode reader software application installed on onsite computer 220. Onsite computer 220 may have printing capability for printing, for example, barcode 230 that is encoded with a unique number. Alternatively, barcode 230 is preprinted and provided to locate technician 224 before being dispatched to the jobsite. Barcode 230 may be implemented as a laminated printed barcode that is a weather resistant and/or ultraviolet (UV) resistant.

In yet another example, site-specific hard link 116 is an RFID tag, such as a RFID tag 232 shown in FIG. 2. In this example, the corresponding hard link reader 226 is an RFID reader device connected to and/or incorporated in onsite computer 220. RFID tag 232 may be a RFID tag device, which is a microchip (not shown) combined with an antenna (not shown) in a compact package. The antenna of the RFID tag picks up signals from an RFID reader or scanner (not shown) and then returns a signal that has the data of interest encoded therein. RFID tag 232 may be provided to locate technician 224 with a unique ID number encoded therein. Additionally, RFID tag 232 may be a writeable RFID tag that is encoded at the jobsite using onsite computer 220. RFID tag 232 may be implemented in a weather resistant and/or UV resistant package.

Site-specific hard link 116, such as barcode 230 and/or RFID tag 232, may be left at the jobsite in a secure, weather resistant, and/or UV resistant manner. In one example, site-specific hard link 116 may be secured to any substantially permanent structure at the jobsite, such as a telephone pole, pedestal, and/or building. In another example, site-specific hard link 116 may be secured to stake or flag that is secured into the ground. In yet another example, site-specific hard link 116 may be secured within, for example, a clear plastic bag, a real estate brochure box with clear window, any type of lockbox, and the like, that is left at the jobsite.

In any case, once electronic data 222 is uploaded to electronic record 114 at central data repository 112, hard link reader 226 may be used to scan, for example, barcode 230 and/or RFID tag 232 and then onsite computer 220 and/or central data repository 112 associates this information with the network link or path of corresponding electronic record 114 at central data repository 112. For example, the unique number of the barcode 230 and/or RFID tag 232 may be associated with the locate operation work order number, which is also associated with the corresponding electronic record 114. In this example, a site-specific hard link 116 in the form of a barcode and/or an RFID tag may be used to provide the network link information to an interested party.

Figure 3:
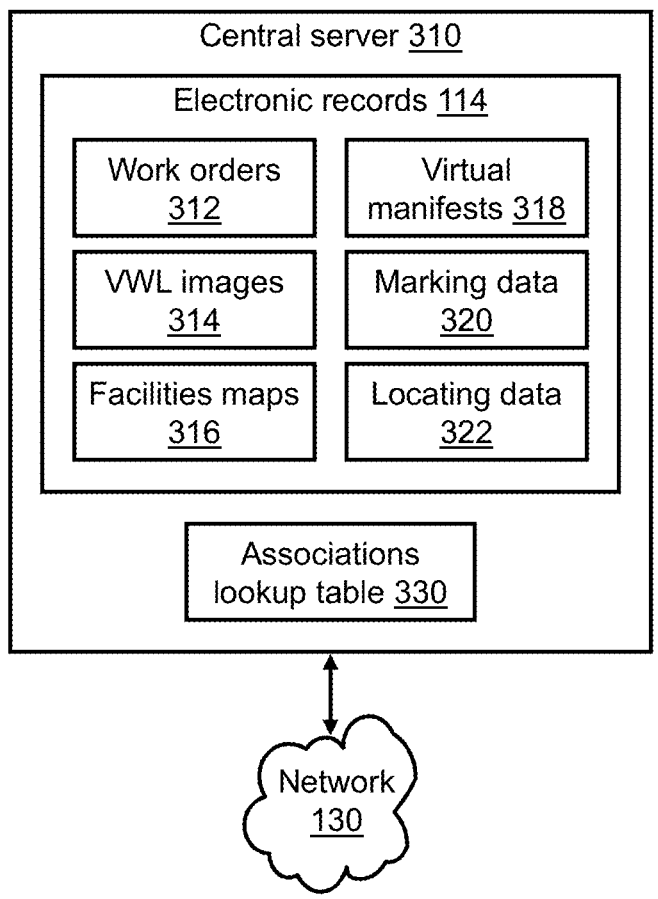
FIG. 3 is a functional block diagram of an example of a central data repository of the locate operations system of FIG. 1, according to embodiments of the invention.

FIG. 3 is a functional block diagram of an example of central data repository 112 of locate operations system 100 of FIG. 1. In this example, central data repository 112 may be implemented as a central server 310 in which electronic records 114 are stored. In one example, central server 310 may be the central server of the locate service provider. Electronic records 114 are electronic records of locate operations, which may include information related to locate operations.

For each locate operation performed, at least one corresponding electronic record 114 is stored at central data repository 112. The information compiled in electronic records 114 may include, but is not limited to, work orders 312, virtual white lines (VWL) images 314, facilities maps 316, electronic manifests 318, marking data 320, locating data 322, and any combinations thereof.

Work orders 312 may be any communication or instruction to perform a locate operation at a dig area, which is any specified geographic area within which excavation may occur. In one example, work orders 312 are electronic locate operation work orders which are submitted to locate companies by excavators.

Additionally, VWL images 314 may be associated with work orders 312. Each VWL image 314 is, for example, a digital aerial image of the dig area, which has been electronically marked up for indicating an area, point, line, and/or path of planned excavation. The markings of each VWL image 314 are geo-referenced. VWL images 314 are created using a computer software application (not shown). For example, the computer software application for creating VWL images 314 may be based on the VWL applications described in U.S. Patent Publication No. 2009/0238417, entitled "Virtual White Lines for Indicating Planned Excavation Sites on Electronic Images", and U.S. Patent Publication No. 2009/0238414, entitled "Virtual White Lines for Delimiting Planned Excavation Sites", which are incorporated herein by reference in their entirety.

Facilities maps 316 may be geo-referenced electronic facilities maps, which are used by locate technicians in the field. With respect to locate operations, facilities maps 316 may be any electronic representation of the geographic location, type, number, and/or other attributes of a facility or facilities. Facilities maps 316 may be provided in any number of computer file formats.

Electronic manifests 318 are created using a computer software application (not shown). For example, the computer software application for creating electronic manifests 318 may be based on the electronic manifest (EM) applications described in U.S. Patent Publication No. 2009/0202101, entitled "Electronic Manifest of Underground Facility Locate Marks," which is incorporated herein by reference in its entirety. The electronic manifest application is an electronic drawing tool that may be used by locate technicians for electronically marking up, for example, a digital aerial image of the dig area for indicating locate marks that have been dispensed at the site, thereby indicating the geo-locations and types of facilities present. The output of the EM application may be referred to as a electronic manifest of the locate operations, e.g., electronic manifests 318.

Marking data 320 may be any information that is returned from a marking device, such as marking device 214. That is, marking data 320 may be the portion of electronic data 222 from onsite computer 220 which includes marking data from marking device 214.

Locating data 322 may be any information that is returned from a locate receiver and/or a locate transmitter, such as locate receiver 210 and/or locate transmitter 212. That is, locating data 322 may be the portion of electronic data 222 from onsite computer 220 which includes locating data from locate receiver 210 and/or locate transmitter 212.

Additionally, central data repository 112 of locate operations system 100 may include an associations lookup table 330. Associations lookup table 330 may store the associations of the unique information of each site-specific hard link 116 and/or each site-specific virtual link 124 with the locate operation work order number, which is also associated with the network link or path to the corresponding electronic record 114. For example, when an interested party retrieves the site-specific hard link 116 and/or site-specific virtual link 124 at the jobsite, the information encoded in site-specific hard link 116 and/or site-specific virtual link 124 is processed against the information in associations lookup table 330 to determine the network link or path that may be followed for accessing the corresponding electronic record 114. In other embodiments, the hard link 116 or the virtual link 124 includes sufficient information to access the corresponding electronic record or records, and an association lookup table is not required.

Figure 4:
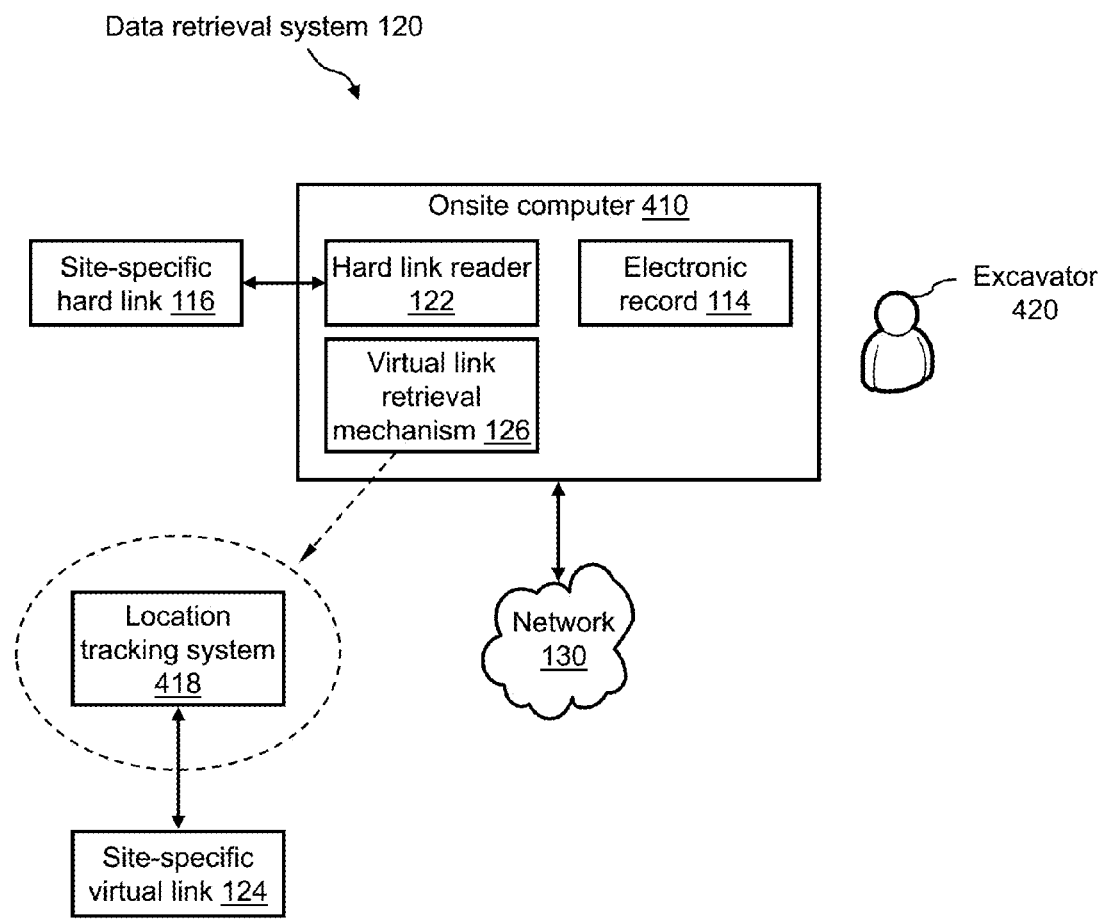
FIG. 4 is a functional block diagram of an example of a data retrieval system of the locate operations system of FIG. 1, according to embodiments of the invention.

FIG. 4 is a functional block diagram of an example of data retrieval system 120 of locate operations system 100 of FIG. 1. Data retrieval system 120 is used at the jobsite to query the information encoded in site-specific hard link 116 and/or site-specific virtual link 124, which are left at the jobsite, and then to access the corresponding electronic record 114.

In this example, data retrieval system 120 may include an onsite computer 410. Onsite computer 410 may be any computing device that is used by an interested party in the field, such as an excavator 420. For example, onsite computer 410 may be an onboard computer associated with a vehicle, a portable computer, a personal computer, a laptop computer, a tablet device, a PDA, a cellular radiotelephone, a mobile computing device, a touch-screen device, a touchpad device, or generally any device including, or connected to, a processor and a user interface. In one example, onsite computer 410 may be used by excavator 420 at the jobsite (e.g., physical jobsite 140) for extracting network link information from site-specific hard link 116 and/or site-specific virtual link 124.

When the site-specific hard link 116 is a printed web page address, onsite computer 410 of data retrieval system 120 may be used to access the web page address. The printed web page address may be manually entered by the user into onsite computer 410 or may be read, for example, by an optical character reader. Data retrieval system 120 also includes hard link reader 122 for extracting the information encoded in site-specific hard links 116. In one example, hard link reader 122 may be any standard barcode scanner device that is connected to onsite computer 410 and/or any well-known barcode reader software application installed on onsite computer 410. In another example, hard link reader 122 may be an RFID reader device connected to and/or incorporated in onsite computer 410.

Data retrieval system 120 also includes virtual link retrieval mechanism 126 for retrieving information from site-specific virtual link 124. In the example wherein site-specific virtual link 124 is the latitude and longitude coordinates of the jobsite (e.g., physical jobsite 140), virtual link retrieval mechanism 126 may be a location tracking system, such as a location tracking system 418, which is connected to and/or incorporated in onsite computer 410.

Location tracking system 418 may include any device that can determine its geographical location to a specified degree of accuracy. For example, location tracking system 418 may include a GPS receiver or a global navigation satellite system (GNSS) receiver. A GPS receiver may provide, for example, any standard format data stream, such as a National Marine Electronics Association (NMEA) data stream. Location tracking system 418 may also include an error correction component (not shown), which may be a mechanism for improving the accuracy of the geo-location data. Additionally, location tracking system 418 may utilize cell phone triangulation techniques for determining geo-location rather than using GPS technology.

In this example, data retrieval system 120 uses location tracking system 418 as the virtual link retrieval mechanism 126 for acquiring the site-specific virtual link 124, which is the GPS coordinates of physical jobsite 140. Data retrieval system 120 then queries central data repository 112 for any GPS-encoded electronic records 114 that substantially match the geolocation of physical jobsite 140. Although site-specific virtual link 124 is considered virtual, like site-specific hard link 116, it may be acquired only by being physically present at the jobsite. Like site-specific hard link 116, site-specific virtual link 124 provides a link to the corresponding electronic records 114. Details of an example of a method of creating and using onsite mechanisms for linking to location-specific electronic records of locate operations are described with reference to FIG. 5.

In yet another example, in a manner similar to that of utilizing the location tracking system 418 as a basis for establishing the site-specific virtual link 124, the virtual link mechanism 126 may employ various methods and apparatus relating to wireless communications, internet access points, and WiFi networks so as to harvest location-specific information (e.g., see "Harvesting of Location-Specific Information through WiFi Networks," J. H. Kang and G. Boriello, published on http://research.microsoft.com/en-us/um/people/jckrumm/LoCA2006_papers/1568978829%20Kang.pdf, which publication is hereby incorporated herein by reference).

Figure 5:
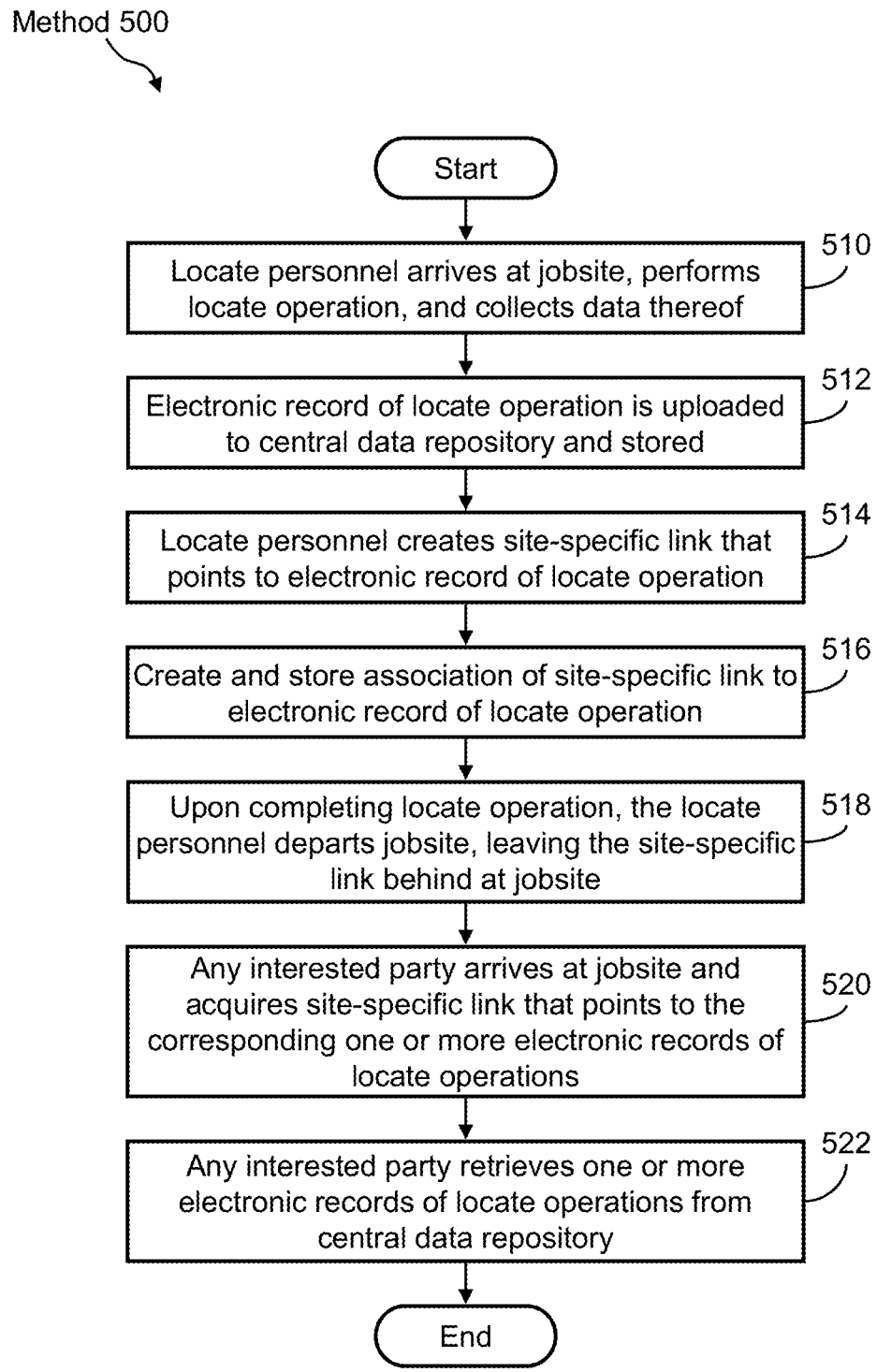
FIG. 5 is a flow diagram of an example of a method of creating and using onsite mechanisms for linking to location-specific electronic records of locate operations, according to embodiments of the invention.

FIG. 5 is a flow diagram of an example of a method 500 of creating and using onsite mechanisms for linking to location-specific electronic records of locate operations. Method 500 may include, but is not limited to, the following acts, which may be implemented in a different order.

In act 510, locate personnel arrives at the jobsite, performs the locate operation, and collects the data thereof. For example, locate technician 224 arrives at physical jobsite 140 and performs the locate operation using locating equipment 200 (e.g., locate receiver 210, locate transmitter 212, and marking device 214). During the locate operation, electronic information is acquired from locating equipment 200 and stored in electronic data 222 at onsite computer 220, which is the computing device used by locate technician 224 at physical jobsite 140.

In act 512, the electronic record of the locate operation is uploaded to the central data repository and stored. For example, at the completion of the locate operation, locate technician 224 uses his/her onsite computer 220 and network 130 to upload electronic data 222 to electronic records 114 at central data repository 112. A component of the electronic record 114 may be locating data 322 from locate receiver 210 and/or locate transmitter 212. Another component of electronic record 114 may be marking data 320 from marking device 214. Yet other components of electronic record 114 may be other information related to the current locate operation, such as, but not limited to, the work order 312 and associated VWL image 314 for the locate operation, the facilities maps 316 associated with physical jobsite 140, and the electronic manifest 318 of the locate operation, which is created by locate technician 224.

In act 514, the locate personnel creates the site-specific link that points to the electronic record of the locate operation. For example, once the electronic record 114 of the locate operation is stored at central data repository 112, locate technician 224 uses his/her onsite computer 220 to create a site-specific hard link 116 to be left at physical jobsite 140. In one example, locate technician 224 uses his/her onsite computer 220 to create and/or process a printed web page address. In another example, locate technician 224 uses his/her onsite computer 220 to create and/or process a printed barcode, such as barcode 230 of FIG. 2. In yet another example, locate technician 224 uses his/her onsite computer 220 to create and/or process an RFID tag, such as RFID tag 232 of FIG. 2.

In act 516, the association of the site-specific link to the electronic record of the locate operation is created and stored. For example, the unique number of the site-specific hard link 116 (e.g. of barcode 230 and/or RFID tag 232) may be associated with the locate operation work order number of the current locate operation. The locate operation work order number is also associated with the corresponding electronic record 114. In the example, the locate operation work order number is the common thread between site-specific hard link 116 and the corresponding electronic record 114. The association of the unique information of site-specific hard link 116 with the locate operation work order number and, thus, to the network link or path to the corresponding electronic record 114 is created and stored in associations lookup table 330.

Continuing act 516, in the case of a site-specific virtual link 124 for the current locate operation in which site-specific virtual link 124 is geo-location information, the unique latitude and longitude coordinates of physical jobsite 140 may be associated with the locate operation work order number of the current locate operation. The locate operation work order number is also associated with the corresponding electronic record 114. Again, the locate operation work order number may be the common thread between site-specific virtual link 124 and the corresponding electronic record 114. The association of the unique geo-location information of site-specific virtual link 124 with the locate operation work order number and, thus, to the network link or path to the corresponding electronic record 114 is created and stored in associations lookup table 330.

In act 518, upon completing the locate operation, the locate personnel departs the jobsite, and leaves the site-specific link at the jobsite. For example, upon completing the locate operation, locate technician 224 departs physical jobsite 140, and leaves site-specific hard link 116 at physical jobsite 140.

In act 520, an interested party arrives at the jobsite and acquires the site-specific link that points to the corresponding electronic record of the locate operation. For example, excavator 420 arrives at physical jobsite 140 with his/her onsite computer 410. Excavator 420 may visually read the printed web page address or may use an optical character reader to read the printed web page address. Additionally, excavator 420 may use hard link reader 122 of his/her onsite computer 410 to interrogate the information encoded in site-specific hard link 116. Further, excavator 420 may use virtual link retrieval mechanism 126 of his/her onsite computer 410 to interrogate the information encoded in site-specific virtual link 124. In any case, the encoded information provides the network link or path to one or more electronic records 114, at central data repository 112, of locate operations that correlate to physical jobsite 140.

In act 522, the interested party retrieves one or more electronic records of locate operations from central data repository. For example, excavator 420 follows the link information acquired in step 520 and retrieves the one or more electronic records 114, stored at central data repository 112, of locate operations that correlate to physical jobsite 140. In one example, excavator 420 uses the link information acquired in act 520 and retrieves the work order 312, VWL image 314, facilities maps 316, electronic manifest 318, marking data 320, and locating data 322 associated with locate operations at physical jobsite 140.

Referring to FIGS. 1 through 5, in another embodiment, site-specific hard link 116 may be implemented as an onsite storage device on which electronic information about the locate operation is stored. In this embodiment, a link to central data repository 112 may not be required, because the information is present directly on the site-specific hard link 116. The onsite storage device may be any device that has sufficient storage capacity to hold a full or partial electronic record of the locate operation. In one example, the onsite storage device may be a writable RFID tag that is written with all or part of the electronic record of the locate operation. In other examples, the onsite storage device may be a CD or a flash memory device containing all or part of the electronic record of the locate operation.

In another example, the onsite storage device may use hologram technology, such as, but not limited to, a holographic barcode. While barcode labels store data in printed parallel lines, holographic barcodes are available in various patterns of dots, concentric circles, and hidden within images. The technique of holography used in barcode labels gives an added depth or a 3D effect to the label, which expands its storage capability. Like a normal barcode, the holographic barcodes are read by standard barcode readers or scanned using image software. With respect to site-specific hard links 116 implemented as onsite storage devices, data generating system 110 and/or data retrieval system 120 are equipped to support the onsite storage devices.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN) or the Internet. Such networks may be based on any suitable technology and may operate according to any suitable protocol and may include wireless networks, wired networks or fiber optic networks.

Any computer discussed herein may comprise a memory, one or more processing units (also referred to herein simply as "processors"), one or more communication interfaces, one or more display units, and one or more user input devices (user interfaces). The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the United States Patent Office Manual of Patent Examining Procedures, Section 2111.03.

The invention claimed is:

1. A method for providing access to an electronic record of a locate operation, the locate operation performed by a locate technician in response to at least one work order and comprising locating and applying, by the locate technician, at least one physical locate mark on ground, pavement, or other surface to indicate a presence or an absence of at least one underground facility at a jobsite, wherein at least a portion of the jobsite is planned to be excavated or disturbed by an excavator during excavation activities, the method comprising:

acquiring, by locate equipment used by the locate technician to perform the locate operation, electronic data related to performance of the locate operation by the locate technician to locate and mark the presence or the absence of the at least one underground facility;

transmitting, by the locate equipment, the acquired electronic data to a data repository for storage in the electronic record of the locate operation, the electronic record comprising at least one of:

an electronic manifest of the locate operation, the electronic manifest including a first digital image of the jobsite and at least one electronic marking electronically drawn on the first digital image by the locate technician via the locate equipment and corresponding to the at least one physical locate mark applied by the locate technician to the ground, pavement, or other surface during the locate operation, so as to graphically depict the locate operation performed by the locate technician; and geographic coordinates for the at least one electronic marking corresponding to the at least one physical locate mark applied by the locate technician to the ground, pavement, or other surface; and providing a site-specific access mechanism that establishes a link to the electronic record of the locate operation, the access mechanism configured for use at the jobsite by an authorized person to access the electronic record of the locate operation.

2. The method of claim 1, wherein providing the access mechanism comprises generating at least one of:

a radio frequency identification (RFID) tag including the link to the electronic record;

a barcode tag including the link to the electronic record;

an address that serves as the link to the electronic record;

a work order number that serves as the link to the electronic record; and geographic coordinates of the jobsite that serve as the link to the electronic record.

3. The method of claim 2, wherein the geographic coordinates of the jobsite are generated from the acquired electronic data.

4. The method of claim 1, wherein the access mechanism is associated with a process for at least one of:

authenticating a user as being authorized to access at least part of the electronic record;

authorizing different levels of access to the electronic record for different users;

logging an instance of use of the access mechanism to access the electronic record; and determining a number of instances of use of the access mechanism to access the electronic record.

5. The method of claim 1, wherein the access mechanism includes an association with at least one of:

the electronic record; and an expiration date.

6. The method of claim 1, wherein the access mechanism stores at least a part of the electronic record.

7. The method of claim 1, wherein the electronic record further comprises at least one of:

a work order for performing the locate operation to locate the presence or the absence of the at least one underground facility at the jobsite;

a virtual white line image for the jobsite including a second digital image of the jobsite marked up for indicating an area, point, and/or line of planned excavation to be performed at the jobsite;

a facilities map relating to the locate operation, the facilities map including an electronic representation of a geographic location, type, and/or number of one or more facilities at the jobsite;

time-stamp information to provide proof of a time relating to the locate operation;

place-stamp information to provide proof of a geographic location relating to the locate operation;

marking material information regarding a characteristic of a marking material dispensed by the locate technician during the locate operation;

locate signal information regarding at least one of a signal strength, a signal frequency, and a depth relating to the locate operation;

a user identification identifying the locate technician;

status information regarding a status of the locate technician;

historical information relating to the locate technician;

at least one member code assigned to a facility owner of the at least one underground facility;

environmental information regarding at least one environmental condition present at or near the jobsite during the locate operation;

a quality assessment relating to the locate operation; and a risk assessment relating to the locate operation.

8. The method of claim 7, wherein the work order is at least one of a locate request and a locate request ticket.

9. The method of claim 7, wherein the characteristic of the marking material is at least one of a color and a type of the marking material.

10. A method for accessing an electronic record of a locate operation, the locate operation performed by a locate technician in response to at least one work order and comprising locating and applying, by the locate technician, at least one physical locate mark on ground, pavement, or other surface to indicate a presence or an absence of at least one underground facility at a jobsite, wherein at least a portion of the jobsite is planned to be excavated or disturbed by an excavator during excavation activities, the method comprising:

obtaining a site-specific access mechanism that establishes a link to the electronic record of the locate operation, the access mechanism configured for use at the jobsite by an authorized person to access the electronic record of the locate operation, the electronic record comprising electronic data related to performance of the locate operation by the locate technician and acquired, by locate equipment used by the locate technician to locate and mark the presence or the absence of the at least one underground facility, wherein the electronic record comprises at least one of:

an electronic manifest for the locate operation, the electronic manifest including a first digital image of the jobsite and at least one electronic marking electronically drawn on the first digital image by the locate technician via the locate equipment and corresponding to the at least one physical locate mark applied by the locate technician to the ground, pavement, or other surface during the locate operation, so as to graphically depict the locate operation performed by the locate technician; and geographic coordinates for the at least one electronic marking corresponding to the at least one physical locate mark applied by the locate technician to the ground, pavement, or other surface; and using the access mechanism at the jobsite to access the electronic record of the locate operation.

11. A locate operations system for providing access to an electronic record of a locate operation, the locate operation performed by a locate technician in response to at least one work order and comprising locating and applying, by the locate technician, at least one physical locate mark on ground, pavement, or other surface to indicate a presence or an absence of at least one underground facility at a jobsite, wherein at least a portion of the jobsite is planned to be excavated or disturbed by an excavator during excavation activities, the system comprising:

at least one communication interface;

a memory to store processor-executable instructions; and at least one processor communicatively coupled to the communication interface and the memory, wherein upon execution of the processor-executable instructions by the at least one processor, the at least one processor:

acquires electronic data related to performance of the locate operation by the locate technician to locate and mark the presence or the absence of the at least one underground facility, via the at least one communication interface from locate equipment used by the locate technician to perform the locate operation;

transmits the acquired electronic data, via the at least one communication interface, to a data repository for storage in the electronic record of the locate operation; and controls a site-specific access mechanism that establishes a link to the electronic record of the locate operation, the site-specific access mechanism configured for use at the jobsite by an authorized person to access the electronic record of the locate operation;

a data repository component for receiving the acquired electronic data for storage in the electronic record of the locate operation, the electronic record comprising at least one of:

an electronic manifest for the locate operation, the electronic manifest including a first digital image of the jobsite and at least one electronic marking electronically drawn on the first digital image by the locate technician via the locate equipment and corresponding to the at least one physical locate mark applied by the locate technician to the ground, pavement, or other surface during the locate operation, so as to graphically depict the locate operation performed by the locate technician; and geographic coordinates for the at least one electronic marking corresponding to the at least one physical locate mark applied by the locate technician to the ground, pavement, or other surface.

12. The system of claim 11, wherein the at least one processor controls the access mechanism by generating at least one of:

a radio frequency identification (RFID) tag including the link to the electronic record;

a barcode tag including the link to the electronic record;

an address that serves as the link to the electronic record;

a work order number that serves as the link to the electronic record; and geographic coordinates of the jobsite that serve as the link to the electronic record.

13. The system of claim 12, wherein the at least one processor generates the geographic coordinates of the jobsite from the acquired electronic data.

14. The system of claim 11, wherein the access mechanism is associated with a process for at least one of:

authenticating a user as being authorized to access at least part of the electronic record;

authorizing different levels of access to the electronic record for different users;

logging an instance of use of the access mechanism to access the electronic record; and determining a number of instances of use of the access mechanism to access the electronic record.

15. The system of claim 11, wherein the access mechanism includes an association with at least one of:

the electronic record; and an expiration date.

16. The system of claim 11, wherein the access mechanism stores at least a part of the electronic record.

17. The system of claim 11, wherein the electronic record further comprises at least one of:

a work order for performing the locate operation to locate the presence or the absence of the at least one underground facility at the jobsite;

a virtual white line image for the jobsite including a second digital image of the jobsite marked up for indicating an area, point, and/or line of planned excavation to be performed at the jobsite;

a facilities map relating to the locate operation, the facilities map including an electronic representation of a geographic location, type, and/or number of one or more facilities at the jobsite;

time-stamp information to provide proof of a time relating to the locate operation;

place-stamp information to provide proof of a geographic location relating to the locate operation;

marking material information regarding a characteristic of a marking material dispensed by the locate technician during the locate operation;

locate signal information regarding at least one of a signal strength, a signal frequency, and a depth relating to the locate operation;

a user identification identifying the locate technician;

status information regarding a status of the locate technician;

historical information relating to the locate technician;

at least one member code assigned to a facility owner of the at least one underground facility;

environmental information regarding at least one environmental condition present at or near the jobsite during the locate operation;

a quality assessment relating to the locate operation; and a risk assessment relating to the locate operation.

18. The system of claim 17, wherein the work order is at least one of a locate request and a locate request ticket.

19. The system of claim 17, wherein the characteristic of the marking material is at least one of a color and a type of the marking material.

20. A locate operations system for accessing an electronic record of a locate operation, the locate operation performed by a locate technician in response to at least one work order and comprising locating and applying, by the locate technician, at least one physical locate mark on ground, pavement, or other surface to indicate a presence or an absence of at least one underground facility at a jobsite, wherein at least a portion of the jobsite is planned to be excavated or disturbed by an excavator during excavation activities, the system comprising:

an access mechanism reader for reading a site-specific access mechanism that establishes a link to the electronic record of the locate operation, the access mechanism configured for use at the jobsite by an authorized person to access the electronic record of the locate operation, the electronic record comprising data related to performance of the locate operation by the locate technician and acquired, by locate equipment used by the locate technician to locate and mark the presence or the absence of the at least one underground facility, wherein the electronic record comprises at least one of:

an electronic manifest for the locate operation, the electronic manifest including a first digital image of the jobsite and at least one electronic marking electronically drawn on the first digital image by the locate technician via the locate equipment and corresponding to the at least one physical locate mark applied by the locate technician to the ground, pavement, or other surface during the locate operation, so as to graphically depict the locate operation performed by the locate technician; and geographic coordinates for the at least one electronic marking corresponding to the at least one physical locate mark applied by the locate technician to the ground, pavement, or other surface; and a memory to store processor-executable instructions;

at least one processor communicatively coupled to the access mechanism reader and the memory, wherein upon execution of the processor-executable instructions by the at least one processor, the at least one processor uses the link to access the electronic record of the locate operation.

* * * * *